United States Patent
Talbot

(10) Patent No.: US 12,144,379 B2
(45) Date of Patent: Nov. 19, 2024

(54) SMOKING SUBSTITUTE DEVICE

(71) Applicant: Imperial Tobacco Limited

(72) Inventor: Oliver Talbot, Liverpool (GB)

(73) Assignee: Imperial Tobacco Limited, Bristol (GB)

( * ) Notice: Subject to any disclaimer, the term of this patent is extended or adjusted under 35 U.S.C. 154(b) by 597 days.

(21) Appl. No.: 17/406,769

(22) Filed: Aug. 19, 2021

(65) Prior Publication Data

US 2021/0378312 A1    Dec. 9, 2021

Related U.S. Application Data

(63) Continuation of application No. PCT/EP2020/054248, filed on Feb. 18, 2020, and a
(Continued)

(30) Foreign Application Priority Data

Feb. 19, 2019  (EP) .................................... 19158108
Feb. 19, 2019  (EP) .................................... 19158116

(51) Int. Cl.
*A24F 40/53*    (2020.01)
*A24F 40/10*    (2020.01)
(Continued)

(52) U.S. Cl.
CPC .............. *A24F 40/53* (2020.01); *A24F 40/10* (2020.01); *A24F 40/60* (2020.01); *A24F 40/65* (2020.01); *G01P 15/02* (2013.01)

(58) Field of Classification Search
CPC .......... A24F 40/53; A24F 40/10; A24F 40/60; A24F 40/65; H01H 35/06; H01H 35/14; H01H 35/24
See application file for complete search history.

(56) References Cited

U.S. PATENT DOCUMENTS 10,440,999 B2 * 10/2019 Tremblay ................ A24F 40/65
10,842,194 B2 * 11/2020 Batista .................... A24F 40/50
(Continued)

FOREIGN PATENT DOCUMENTS

CN    203969212 U    12/2014
CN    104664605       6/2015
(Continued)

OTHER PUBLICATIONS

International Search Report and Written Opinion (PCT/EP2020/054245); May 8, 2020, 8 pages.
(Continued)

*Primary Examiner* — Edwin A. Leon
(74) *Attorney, Agent, or Firm* — DUNLAP CODDING, P.C.

(57) ABSTRACT

A smoking substitute device and a method of operating a smoking substitute device. The smoking substitute device comprising: a control unit; and an accelerometer, configured to detect an orientation of the smoking substitute device and provide data indicative of the detected orientation to the control unit. The control unit is configured to trigger an alert when it determines from the data indicative of the detected orientation that the smoking substitute device will function improperly. The control unit is configured to determine from the data indicative of the detected orientation that the smoking substitute device will function improperly when the data indicative of the detected orientation indicates that a gravity fed heating device of the smoking substitute device has been located above a tank containing a vaporizable liquid for a predetermined period of time ($t_1$), wherein the predetermined period of time is at least 30 minutes.

18 Claims, 8 Drawing Sheets

Related U.S. Application Data continuation of application No. PCT/EP2020/054245, filed on Feb. 18, 2020.

(51) Int. Cl.
*A24F 40/60* (2020.01)
*A24F 40/65* (2020.01)
*G01P 15/02* (2013.01)

(56)  References Cited

U.S. PATENT DOCUMENTS

| | | | |
|---|---|---|---|
| 11,284,646 B2* | 3/2022 | Janardhan | G10L 25/18 |
| 11,528,944 B2* | 12/2022 | Fard | A24F 40/53 |
| 2016/0261020 A1 | 9/2016 | Marion | |
| 2016/0331035 A1 | 11/2016 | Cameron | |
| 2017/0231277 A1 | 8/2017 | Mironov | |
| 2017/0340014 A1 | 11/2017 | Batista et al. | |
| 2018/0070641 A1 | 3/2018 | Batista et al. | |
| 2018/0286207 A1 | 10/2018 | Baker et al. | |
| 2018/0338529 A1 | 11/2018 | Weigensberg et al. | |

FOREIGN PATENT DOCUMENTS

| | | |
|---|---|---|
| EP | 2399636 | 12/2011 |
| EP | 3292771 | 3/2018 |
| WO | WO 2017/055799 | 4/2017 |
| WO | WO 2018/158081 | 9/2018 |

OTHER PUBLICATIONS

International Search Report and Written Opinion (PCT/EP2020/054248); May 11, 2020; 13 pages.

\* cited by examiner

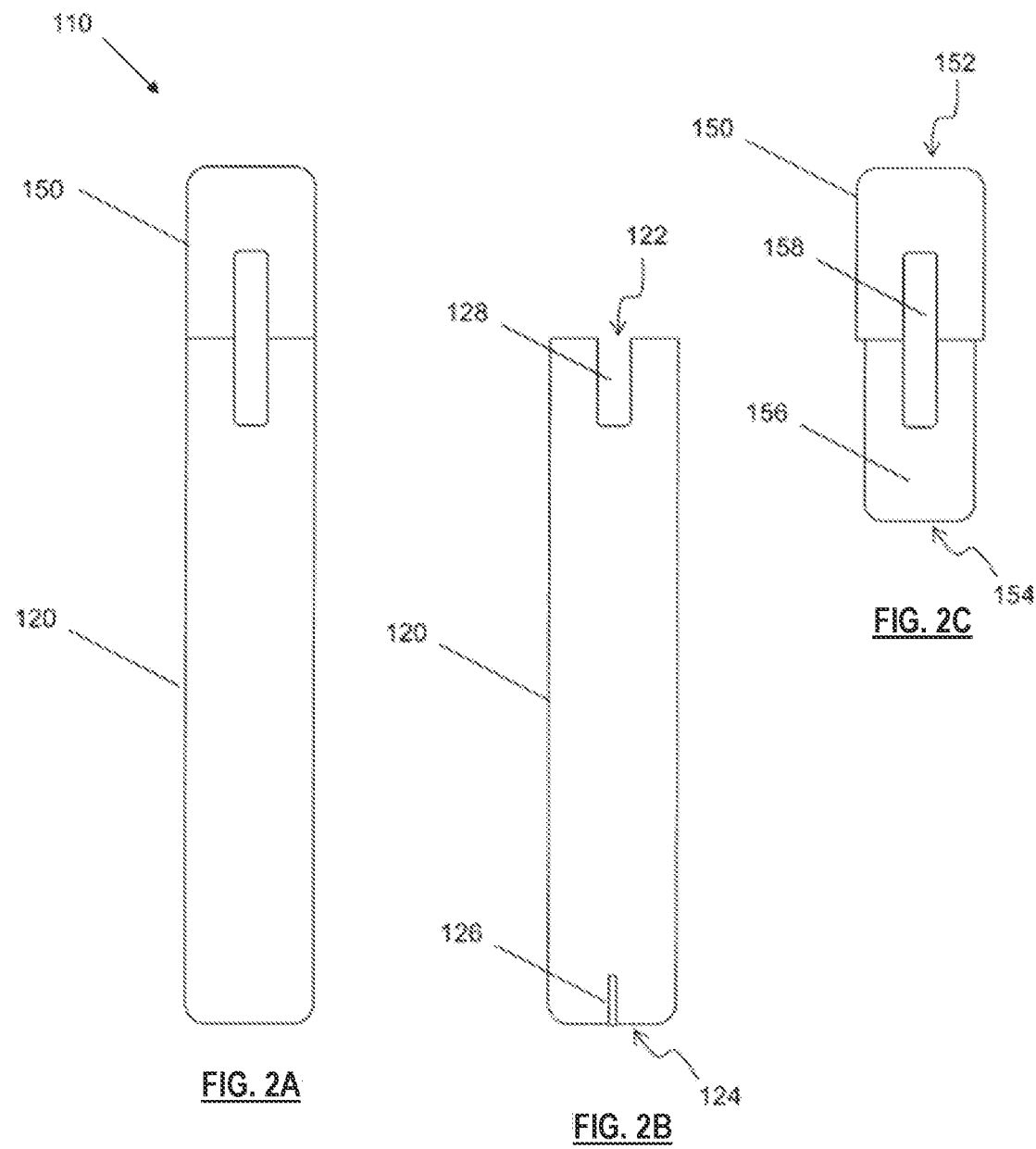

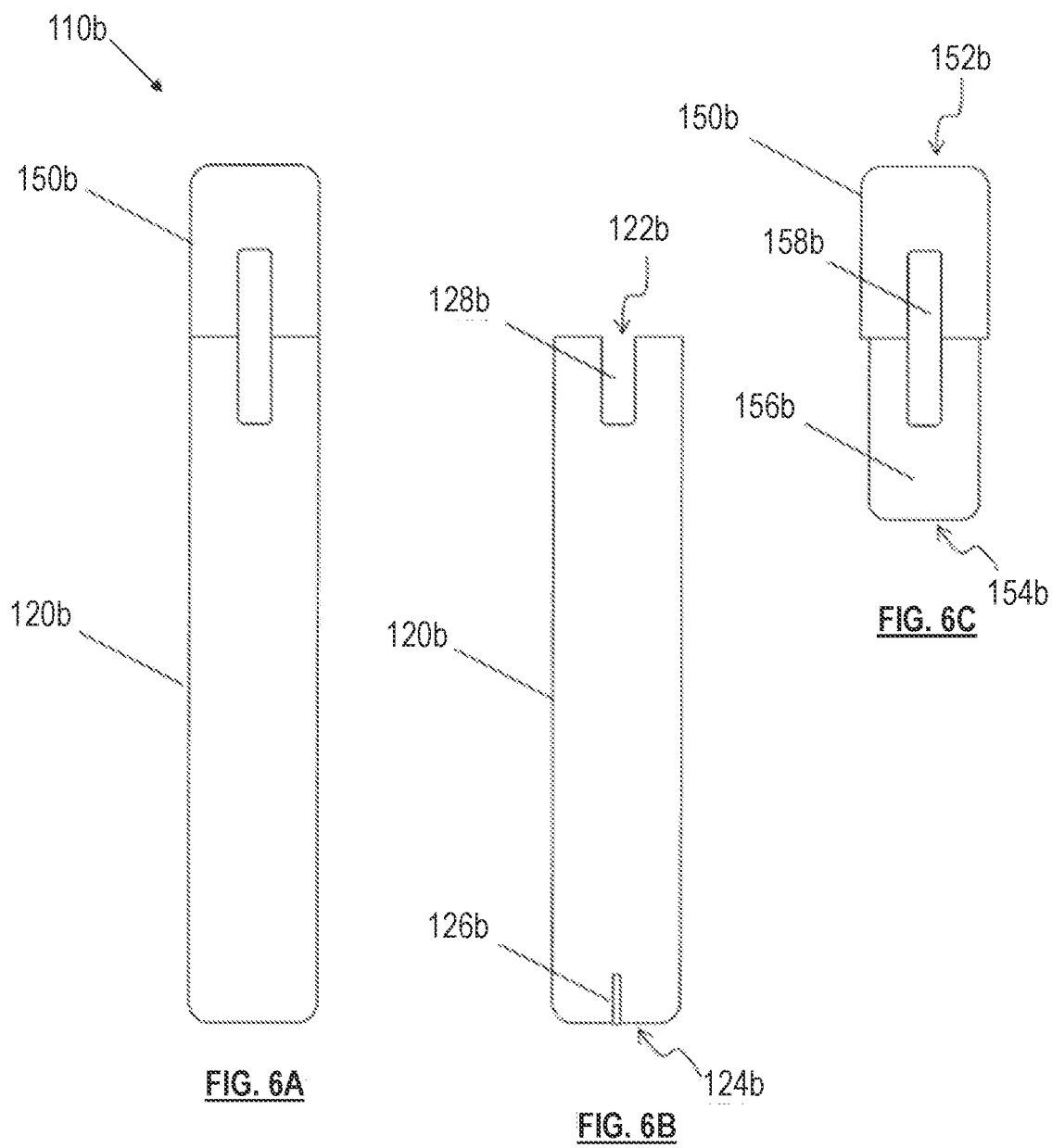

SMOKING SUBSTITUTE DEVICE

CROSS REFERENCE TO RELATED APPLICATIONS/INCORPORATION BY REFERENCE STATEMENT

This application is a non-provisional application claiming benefit to the international application no. PCT/EP2020/054248 filed on Feb. 18, 2020, which claims priority to EP 19158108.1 filed on Feb. 19, 2019. This application also claims benefit to the international application no. PCT/EP2020/054245 filed on Feb. 18, 2020, which claims priority to EP 19158116.4 filed on Feb. 19, 2019.

FIELD OF THE DISCLOSURE

The present disclosure relates to a smoking substitute device and particularly, although not exclusively, to a smoking substitute device which uses an accelerometer to improve a user's experience.

The present disclosure also relates to a smoking substitute device and particularly, although not exclusively, to a smoking substitute device including a wire antenna.

BACKGROUND

The smoking of tobacco is generally considered to expose a smoker to potentially harmful substances. It is generally thought that a significant amount of the potentially harmful substances are generated through the heat caused by the burning and/or combustion of the tobacco and the constituents of the burnt tobacco in the tobacco smoke itself.

Conventional combustible smoking articles, such as cigarettes, typically comprise a cylindrical rod of tobacco comprising shreds of tobacco which is surrounded by a wrapper, and usually also a cylindrical filter axially aligned in an abutting relationship with the wrapped tobacco rod. The filter typically comprises a filtration material which is circumscribed by a plug wrap. The wrapped tobacco rod and the filter are joined together by a wrapped band of tipping paper that circumscribes the entire length of the filter and an adjacent portion of the wrapped tobacco rod. A conventional cigarette of this type is used by lighting the end opposite to the filter, and burning the tobacco rod. The smoker receives mainstream smoke into their mouth by drawing on the mouth end or filter end of the cigarette.

Combustion of organic material such as tobacco is known to produce tar and other potentially harmful by-products. There have been proposed various smoking substitute devices in order to avoid the smoking of tobacco.

Such smoking substitute devices can form part of nicotine replacement therapies aimed at people who wish to stop smoking and overcome a dependence on nicotine.

Smoking substitute devices may comprise electronic systems that permit a user to simulate the act of smoking by producing an aerosol (also referred to as a "vapor") that is drawn into the lungs through the mouth (inhaled) and then exhaled. The inhaled aerosol typically bears nicotine and/or flavorings without, or with fewer of, the odor and health risks associated with traditional smoking.

In general, smoking substitute devices are intended to provide a substitute for the rituals of smoking, whilst providing the user with a similar experience and satisfaction to those experienced with traditional smoking and tobacco products. Some smoking substitute systems use smoking substitute articles (also referred to as a "consumables") that are designed to resemble a traditional cigarette and are cylindrical in form with a mouthpiece at one end.

The popularity and use of smoking substitute devices have grown rapidly in the past few years. Although originally marketed as an aid to assist habitual smokers wishing to quit tobacco smoking, consumers are increasingly viewing smoking substitute devices as desirable lifestyle accessories. Some smoking substitute devices are designed to resemble a traditional cigarette and are cylindrical in form with a mouthpiece at one end. Other smoking substitute devices do not generally resemble a cigarette (for example, the smoking substitute device may have a generally box-like form).

There are a number of different categories of smoking substitute devices, each utilizing a different smoking substitute approach. A smoking substitute approach corresponds to the manner in which the substitute system operates for a user.

One approach for a smoking substitute device is the so-called "vaping" approach, in which a vaporizable liquid, typically referred to (and referred to herein) as "e-liquid", is heated by a heating device to produce an aerosol vapor which is inhaled by a user. An e-liquid typically includes a base liquid as well as nicotine and/or flavorings. The resulting vapor therefore typically contains nicotine and/or flavorings. The base liquid may include propylene glycol and/or vegetable glycerin.

A typical vaping smoking substitute device includes a mouthpiece, a power source (typically a battery), a tank for containing e-liquid, as well as a heating device. In use, electrical energy is supplied from the power source to the heating device, which heats the e-liquid to produce an aerosol (or "vapor") which is inhaled by a user through the mouthpiece.

Vaping smoking substitute devices can be configured in a variety of ways. For example, there are "closed system" vaping smoking substitute devices which typically have a sealed tank and heating element which is pre-filled with e-liquid and is not intended to be refilled by an end user. One subset of closed system vaping smoking substitute devices include a main body which includes the power source, wherein the main body is configured to be physically and electrically coupled to a consumable including the tank and the heating element. In this way, when the tank of a consumable has been emptied, the main body can be reused by connecting it to a new consumable. Another subset of closed system vaping smoking substitute devices is completely disposable, and intended for one-use only.

There are also "open system" vaping smoking substitute devices which typically have a tank that is configured to be refilled by a user, so the device can be used multiple times.

An example vaping smoking substitute device is the myblu® e-cigarette. The myblu® e-cigarette is a closed system device which includes a main body and a consumable. The main body and consumable are physically and electrically coupled together by pushing the consumable into the main body. The main body includes a rechargeable battery. The consumable includes a mouthpiece, a sealed tank which contains e-liquid, as well as a heating device, which for this device is a heating filament coiled around a portion of a wick which is partially immersed in the e-liquid. The device is activated when a microprocessor on board the main body detects a user inhaling through the mouthpiece. When the device is activated, electrical energy is supplied from the power source to the heating device, which heats e-liquid from the tank to produce a vapor which is inhaled by a user through the mouthpiece.

Another example vaping smoking substitute device is the blu PRO® e-cigarette. The blu PRO® e-cigarette is an open system device which includes a main body, a (refillable) tank, and a mouthpiece. The main body and tank are physically and electrically coupled together by screwing one to the other. The mouthpiece and refillable tank are physically coupled together by screwing one of the other, and detaching the mouthpiece from the refillable tank allows the tank to be refilled with e-liquid. The device is activated by a button on the main body. When the device is activated, electrical energy is supplied from the power source to a heating device, which heats e-liquid from the tank to produce a vapor which is inhaled by a user through the mouthpiece.

Another approach for a smoking substitute system is the so-called Heated Tobacco ("HT") approach in which tobacco (rather than an "e-liquid") is heated or warmed to release vapor. HT is also known as "heat not burn" ("HNB"). The tobacco may be leaf tobacco or reconstituted tobacco. The vapor may contain nicotine and/or flavorings. In the HT approach the intention is that the tobacco is heated but not burned, i.e., the tobacco does not undergo combustion.

A typical HT smoking substitute system may include a device and a consumable. The consumable may include the tobacco material. The device and consumable may be configured to be physically coupled together. In use, heat may be imparted to the tobacco material by a heating element of the device, wherein airflow through the tobacco material causes components in the tobacco material to be released as vapor. A vapor may also be formed from a carrier in the tobacco material (this carrier may for example include propylene glycol and/or vegetable glycerin) and additionally volatile compounds released from the tobacco. The released vapor may be entrained in the airflow drawn through the tobacco.

As the vapor passes through the consumable (entrained in the airflow) from the location of vaporization to an outlet of the consumable (e.g., a mouthpiece), the vapor cools and condenses to form an aerosol for inhalation by the user. The aerosol will normally contain the volatile compounds.

In HT smoking substitute systems, heating as opposed to burning the tobacco material is believed to cause fewer, or smaller quantities, of the more harmful compounds ordinarily produced during smoking. Consequently, the HT approach may reduce the odor and/or health risks that can arise through the burning, combustion and pyrolytic degradation of tobacco.

There may be a need for improved design of smoking substitute systems, in particular HT smoking substitute systems, to enhance the user experience and improve the function of the HT smoking substitute system.

An example of the HT approach is the IQOS® smoking substitute device from Philip Morris Ltd. The IQOS® smoking substitute device uses a consumable, including reconstituted tobacco located in a wrapper. The consumable includes a holder incorporating a mouthpiece. The consumable may be inserted into a main body that includes a heating device. The heating device has a thermally conductive heating knife which penetrates the reconstituted tobacco of the consumable, when the consumable is inserted into the heating device. Activation of the heating device heats the heating element (in this case a heating knife), which, in turn, heats the tobacco in the consumable. The heating of the tobacco causes it to release nicotine vapor and flavorings which may be drawn through the mouthpiece by the user through inhalation.

A second example of the HT approach is the device known as "Glo"® from British American Tobacco p.l.c. Glo® comprises a relatively thin consumable. The consumable includes leaf tobacco which is heated by a heating device located in a main body. When the consumable is placed in the main body, the tobacco is surrounded by a heating element of the heating device. Activation of the heating device heats the heating element, which, in turn, heats the tobacco in the consumable. The heating of the tobacco causes it to release nicotine vapor and flavorings which may be drawn through the consumable by the user through inhalation. The tobacco, when heated by the heating device, is configured to produce vapors when heated rather than when burned (as in a smoking apparatus, e.g., a cigarette). The tobacco may contain high levels of aerosol formers (carrier), such as vegetable glycerin ("VG") or propylene glycol ("PG").

The present inventor has observed that most smoking substitute devices currently on the market are configured to operate in isolation of other devices, which limits the functions the smoking substitute devices can perform.

The present inventor has also observed that smoking substitute devices currently on the market do not monitor for, nor mitigate against, the smoking substitute device operating incorrectly as a result of being held in an incorrect orientation.

The present disclosure has been devised in light of the above considerations.

SUMMARY OF THE DISCLOSURE

First Mode: A smoking substitute device comprising a control unit and an accelerometer In a first aspect of a first mode, the present disclosure provides a smoking substitute device, comprising: a control unit; and an accelerometer, configured to detect an orientation of the smoking substitute device and provide data indicative of the detected orientation to the control unit; wherein the control unit is configured to trigger an alert when it determines from the data indicative of the detected orientation (received from the accelerometer) that the smoking substitute device will function improperly.

Advantageously, such a smoking substitute device can better improve a user's experience of the smoking substitute device by helping to ensure that the smoking substitute device will not be used when it has been held in an inappropriate orientation. By 'will function improperly' it may be meant that a wick of a heating device of the smoking substitute device, used by the heating device to generate a vapor, may have become desaturated or dry and so not contain a sufficient amount of vaporizable liquid. For example, the smoking substitute device may be considered to function improperly when the wick is: at most 70% saturated with vaporizable liquid, at most 60% saturated with vaporizable liquid, at most 50% saturated with vaporizable liquid, or saturated with vaporizable liquid at level which is less than 50%. Accordingly, the smoking substitute device may function improperly in that the wick may burn when electrical energy is supplied to the heating device, the user may experience an unpleasant taste when electrical energy is supplied to the heating device, and/or the smoking substitute device may not generate a desired quantity of vapor when electrical energy is supplied to the heating device.

The accelerometer may be a single axis accelerometer or a multi axis accelerometer, e.g., a three-axis accelerometer. It is possible to detect orientation within a limited arc with a single-axis accelerometer (see, e.g., https://www.digikey.com/en/articles/techzone /2011/may/using-an-accelerometer-for-inclination-sensing). However, a multi-axis accelerometer allows for more robust and more accurate orientation detection with fewer limitations, with two or three axes often being preferred. Most smartphones typically make use of three-axis models, whereas cars simply use only a two-axis to determine the moment of impact. The sensitivity of accelerometers can be quite high as they're intended to measure even very minute shifts in acceleration. The more sensitive the accelerometer, the more easily it can measure acceleration.

In some embodiments, the control unit is configured to determine from the data indicative of the detected orientation that the smoking substitute device will function improperly when the data indicative of the detected orientation indicates that a gravity fed heating device of the smoking substitute device has been located above a tank containing a vaporizable liquid for a predetermined period of time ($t_1$). The predetermined period of time may be one in which the gravity fed heating device would have dried or become sufficiently desaturated as to function improperly. For example, the predetermined period of time may be: at least 30 minutes, at least 60 minutes, at least 120 minutes, at least 180 minutes, or more than 180 minutes.

In some embodiments, the control unit is configured to determine whether the smoking substitute device is held in an inappropriate orientation whilst the heating device (162) is being used, and to trigger the alert immediately when it is determined that the smoking substitute device is held in an inappropriate orientation whilst the heating device (162) is being used.

In some embodiments, the predetermined period of time is a first predetermined period of time, wherein the control unit is configured to re-enable the smoking substitute device when it is determined, via the data indicative of the detected orientation, that the smoking substitute device has been held in an appropriate orientation for a second predetermined period of time ($t_2$). The second predetermined period of time may be one long enough for the gravity fed heating device to be sufficiently replenished with vaporizable liquid, for example at least 1 second, at least 2 seconds, at least 3 seconds, at least 4 seconds. Preferably, the second predetermined period is no more than 5 seconds. Preferably, the second predetermined period of time is at least 1 second.

In some embodiments, the control unit is configured to re-enable the smoking substitute device when it receives a re-enablement signal from a remote device (2) via a wireless interface (134) of the smoking substitute device.

Triggering the alert may include disabling the smoking substitute device. For example, disabling the smoking substitute device may include disabling a heating device used by the smoking substitute device to vaporize a vaporizable liquid. Disabling the heating device may include preventing electrical energy from being supplied to the heating device.

The control unit may be configured to re-enable the smoking substitute device when it is determined, via the data indicative of the detected orientation, that the smoking substitute device has been held in an appropriate orientation for a first predetermined period of time. The appropriate orientation may be one in which a gravity fed heating device of the smoking substitute device is located below a tank containing a vaporizable liquid. The first predetermined period of time may be one long enough for the gravity fed heating device to be sufficiently replenished with vaporizable liquid, for example at least 1 second, at least 2 seconds, at least 3 seconds, at least 4 seconds. Preferably, the first predetermined period is no more than 5 seconds.

The smoking substitute device may include a wireless interface, wherein the control unit is configured to provide the data indicative of the detected orientation to a remote device via the wireless interface. The remote device may be a mobile device, e.g., a smart phone.

Triggering the alert may include sending a message via the wireless interface to a remote device indicating that the smoking substitute device will function improperly. For example, the control unit may send a message to a remote device (e.g., a mobile device such as a smart phone) which is then presented to the user in the form of an alert.

The smoking substitute device may be included in a system that also includes the remote device.

Triggering the alert may include activating an indicator light on the smoking substitute device. For example, a light emitting diode (LED) may be activated in response to the alert, or may change to a color indicative that the smoking substitute device will function improperly.

The control unit may be configured to determine from the data indicative of the detected orientation that the smoking substitute device will function improperly when the data indicative of the detected orientation indicates that a gravity fed heating device of the smoking substitute device is located above a tank containing a vaporizable liquid, indicates that a gravity fed heating device of the smoking substitute device was located above a tank containing a vaporizable liquid when the smoking substitute device was used by a user, or indicates that a gravity fed heating device has been located above a tank containing a vaporizable liquid for a second predetermined period of time. The second predetermined period of time may be one in which the gravity fed heating device would have dried or become sufficiently desaturated as to function improperly. For example, the second predetermined period of time may be: at least 30 minutes, at least 60 minutes, at least 120 minutes, at least 180 minutes, or more than 180 minutes.

The control unit may be configured to determine from the data indicative of the detected orientation that the smoking substitute device will function improperly when the data indicative of the detected orientation indicates that a wick of the smoking substitute device is not saturated with a vaporizable liquid.

In a second aspect of the first mode, the present disclosure provides a smoking substitute device comprising: a control unit; an accelerometer, configured to detect an orientation of the smoking substitute device and provide data indicative of the detected orientation to the control unit; and a wireless interface; wherein the control unit is configured to provide the data indicative of the detected orientation to a remote device via the wireless interface.

The smoking substitute device may be included in a system that also includes the remote device.

The remote device or the control unit may be configured to trigger an alert when it determines from the data indicative of the detected orientation that the smoking substitute device will function improperly. Where the remote device makes this determination, part of triggering the alert may include sending a message indicating that the smoking substitute device will function improperly to the smoking substitute device.

Triggering the alert may include disabling the smoking substitute device, this may be done by the remote device, e.g., by issuing a disable signal that is received at the smoking substitute device via the wireless interface of the smoking substitute device. For example, disabling the smoking substitute device may include disabling a heating device used by the smoking substitute device to vaporize a vaporizable liquid. Disabling the heating device may include preventing electrical energy from being provided to the heating device.

One or more features of the smoking substitute device according to the first aspect of the first mode of the present disclosure may be present in the smoking substitute device according to the second aspect of the first mode of the present disclosure, except where such features are incompatible.

For example, the control unit may be configured to re-enable the smoking substitute device when it is determined, via data received from the accelerometer, that the smoking substitute device has been held in an appropriate orientation for a first predetermined period of time. The appropriate orientation may be one in which a gravity fed heating device of the smoking substitute device is located below a tank containing a vaporizable liquid. The first predetermined period of time may be one long enough for the gravity fed heating device to be sufficiently replenished with vaporizable liquid, for example at least 1 second, at least 2 seconds, at least 3 seconds, at least 4 seconds. Preferably, the first predetermined period is no more than 5 seconds.

Additionally, or alternatively, the control unit may be configured to re-enable the smoking substitute device when it receives a re-enablement signal from the remote device (e.g., via the wireless interface of the smoking substitute device). The remote device may be configured to issue the re-enablement signal when it has determined, via the data indicative of the detected orientation, that the smoking substitute device has been held in an appropriate orientation for a first predetermined period of time.

Triggering the alert may include activating an indicator light on the smoking substitute device. For example, a light emitting diode (LED) may be activated in response to the alert, or may change to a color indicative that the smoking substitute device will function improperly.

The remote device, or control unit, may be configured to determine from the data indicative of the detected orientation that the smoking substitute device will function improperly when the data received from the accelerometer indicates that a gravity fed heating device of the smoking substitute device is located above a tank containing a vaporizable liquid, indicates that a gravity fed heating device of the smoking substitute device was located above a tank containing a vaporizable liquid when the smoking substitute device was used by a user, or indicates that a gravity fed heating device of the smoking substitute device has been located above a tank containing a vaporizable liquid for a second predetermined period of time. The second predetermined period of time may be one in which the gravity fed heating device would have dried or become sufficiently desaturated as to function improperly. For example, the second predetermined period of time may be: at least 30 minutes, at least 60 minutes, at least 120 minutes, at least 180 minutes, or more than 180 minutes.

The remote device or control unit may be configured to determine from the data indicative of the detected orientation that the smoking substitute device will function improperly when the data indicative of the detected orientation indicates that the smoking substitute device indicates that a wick of the smoking substitute device is not saturated with a vaporizable liquid.

In a third aspect of the first mode, the present disclosure provides a method of operating a smoking substitute device, having the steps of: monitoring data indicative of a detected orientation of the smoking substitute device as provided by an accelerometer of the smoking substitute device; determining, from the data indicative of the detected orientation, that the smoking substitute device will function improperly; and triggering an alert in response to the determination.

In some embodiments, the method may include determining from the data indicative of the detected orientation that the smoking substitute device will function improperly when the data indicative of the detected orientation indicates that a gravity fed heating device of the smoking substitute device has been located above a tank containing a vaporizable liquid for a predetermined period of time ($t_1$). The predetermined period of time may be one in which the gravity fed heating device would have dried or become sufficiently desaturated as to function improperly. For example, the predetermined period of time may be: at least 30 minutes, at least 60 minutes, at least 120 minutes, at least 180 minutes, or more than 180 minutes.

Triggering the alert may include disabling the smoking substitute device. For example, disabling the smoking substitute device may include disabling a heater used by the smoking substitute device to vaporize a vaporizable liquid. Disabling the heater may include preventing power from being provided to the heater.

The method may include a step, after disabling the device, of re-enabling the smoking substitute device when it is determined, via the data indicative of the detected orientation, that the smoking substitute device has been held in an appropriate orientation for a first predetermined period of time. The appropriate orientation may be one in which a gravity fed heating device of the smoking substitute device is located below a tank containing a vaporizable liquid. The first predetermined period of time may be one long enough for the gravity fed heating device to be sufficiently replenished with vaporizable liquid, for example at least 1 second, at least 2 seconds, at least 3 seconds, at least 4 seconds. Preferably, the first predetermined period is no more than 5 seconds. The determination that the smoking substitute device has been held in an appropriate orientation for the first predetermined period of time could be made by (e.g., a control unit of) the smoking substitute device and/or a remote device, for example.

Triggering the alert may include activating an indicator light on the smoking substitute device. For example, a light emitting diode (LED) may be activated in response to the alert, or may change to a color indicative that the smoking substitute device will function improperly.

Determining that the smoking substitute device will function improperly may occur when the data indicative of the detected orientation indicates that a gravity fed heating device of the smoking substitute device is located above a tank containing a vaporizable liquid, indicates that a gravity fed heating device of the smoking substitute device was located above a tank containing a vaporizable liquid when the smoking substitute device was used by a user, or indicates that a gravity fed heating device of the smoking substitute device has been located above a tank containing a vaporizable liquid for a second predetermined period of time. The second predetermined period of time may be one in which the gravity fed heating device would have dried or become sufficiently desaturated as to function improperly. For example, the second predetermined period of time may be: at least 30 minutes, at least 60 minutes, at least 120 minutes, at least 180 minutes, or more than 180 minutes.

The method may be performed by a smoking substitute device according to the first aspect of the first mode of the present disclosure and/or the second aspect of the first mode of the present disclosure. The method may include one or more method steps corresponding to one or more features described in connection with the first and/or second aspect of the first mode of the present disclosure.

Further aspects of the first mode of the present disclosure provide: a computer program comprising code which, when run on a computer, causes the computer to perform the method of the third aspect of the first mode; a computer readable medium storing a computer program comprising code which, when run on a computer, causes the computer to perform the method of the third aspect of the first mode; and a computer system programmed to perform the method of the third aspect of the first mode.

The present disclosure includes the combination of the aspects and preferred features of the first mode described except where such a combination is clearly impermissible or expressly avoided.

The skilled person will appreciate that except where mutually exclusive, a feature or parameter described in relation to any one of the above aspects of the first mode may be applied to any other aspect of the first mode. Furthermore, except where mutually exclusive, any feature or parameter of the first mode described herein may be applied to any aspect of the first mode and/or combined with any other feature or parameter of the first mode described herein.

Second Mode: A Smoking Substitute Device Comprising a Printed Circuit Board Assembly In a first aspect of a second mode, the present disclosure provides a smoking substitute device, comprising: a printed circuit board assembly including a processor; a wire antenna, configured to allow the processor to wirelessly communicate with a remote device; and a battery, for powering the smoking substitute device.

In some embodiments, the wire antenna may be located between an extremity of the smoking substitute device closer to the printed circuit board than the battery, and an extremity of the battery closest to the printed circuit board assembly.

Thus, the first aspect of the second mode of the present disclosure may provide: a smoking substitute device, comprising: a printed circuit board assembly including a processor; a wire antenna, configured to allow the processor to wirelessly communicate with a remote device; and a battery, for powering the smoking substitute device; wherein the wire antenna is located between an extremity of the smoking substitute device closer to the printed circuit board assembly than the battery, and an extremity of the battery closest to the printed circuit board assembly.

The resulting smoking substitute device can implement wireless connectivity with a reduction in the footprint required for the wire antenna.

In some embodiments, the wire antenna may be positioned to solely overlap with a surface area of the printed circuit board. The resulting smoking substitute device can implement wireless connectivity with a reduction in the footprint required for the wire antenna.

In some embodiments, the wire antenna may be located between an extremity of the smoking substitute device and an extremity of the battery closest to the printed circuit board assembly, and the wire antenna may be closer to the printed circuit board assembly than the battery. The resulting smoking substitute device can implement wireless connectivity with a reduction in the footprint required for the wire antenna.

The printed circuit board assembly may include a connector port, located on a distal most portion of the printed circuit board assembly to the battery, and the wire antenna may be located solely between the connector port and the battery.

The wire antenna may be affixed to an interior surface of the smoking substitute device via an adhesive.

The smoking substitute device may include a housing, and the housing may contain the printed circuit board assembly, wire antenna, and battery, and may be formed of two segments: a first segment, encapsulating the wire antenna, which is formed of a material transparent to signals emitted and received by the wire antenna; and a second segment, encapsulating the battery, which is formed of a material opaque to the signals emitted and received by the wire antenna.

The first segment may be formed of a plastic, and/or the second segment may be formed of a metal. The wire antenna may be soldered to a plated hole of the printed circuit board assembly.

The wire antenna may be 30 mm long.

The wire antenna may initially extend from a connection point with the printed circuit board assembly in a direction away from the battery. The wire antenna may subsequently extend from a first lateral side of the smoking substitute device to an opposing lateral side of the smoking substitute device.

The skilled person will appreciate that except where mutually exclusive, a feature or parameter described in relation to any one of the above aspects of the second mode may be applied to any other aspect of the second mode. Furthermore, except where mutually exclusive, any feature or parameter of the second mode described herein may be applied to any aspect of the second mode and/or combined with any other feature or parameter of the second mode described herein.

SUMMARY OF THE FIGURES

Embodiments and experiments illustrating the principles of the present disclosure will now be discussed with reference to the accompanying figures in which:

FIG. 2A shows an example smoking substitute device of the first mode for use as the smoking substitute device in the system of FIG. 1.

FIG. 2B shows the main body of the smoking substitute device of FIG. 2A without the consumable.

FIG. 2C shows the consumable of the smoking substitute device of FIG. 2A without the main body.

FIG. 6A shows an example smoking substitute device of the second mode for use as the smoking substitute device in the system of FIG. 5.

FIG. 6B shows the main body of the smoking substitute device of FIG. 6A without the consumable.

FIG. 6C shows the consumable of the smoking substitute device of FIG. 6A without the main body.

DETAILED DESCRIPTION OF THE FIGURES

First Mode: A Smoking Substitute Device Comprising a Control Unit and an Accelerometer Aspects and embodiments of the present disclosure will now be discussed with reference to the accompanying figures. Further aspects and embodiments will be apparent to those skilled in the art. All documents mentioned in this text are incorporated herein by reference.

Figure 1:
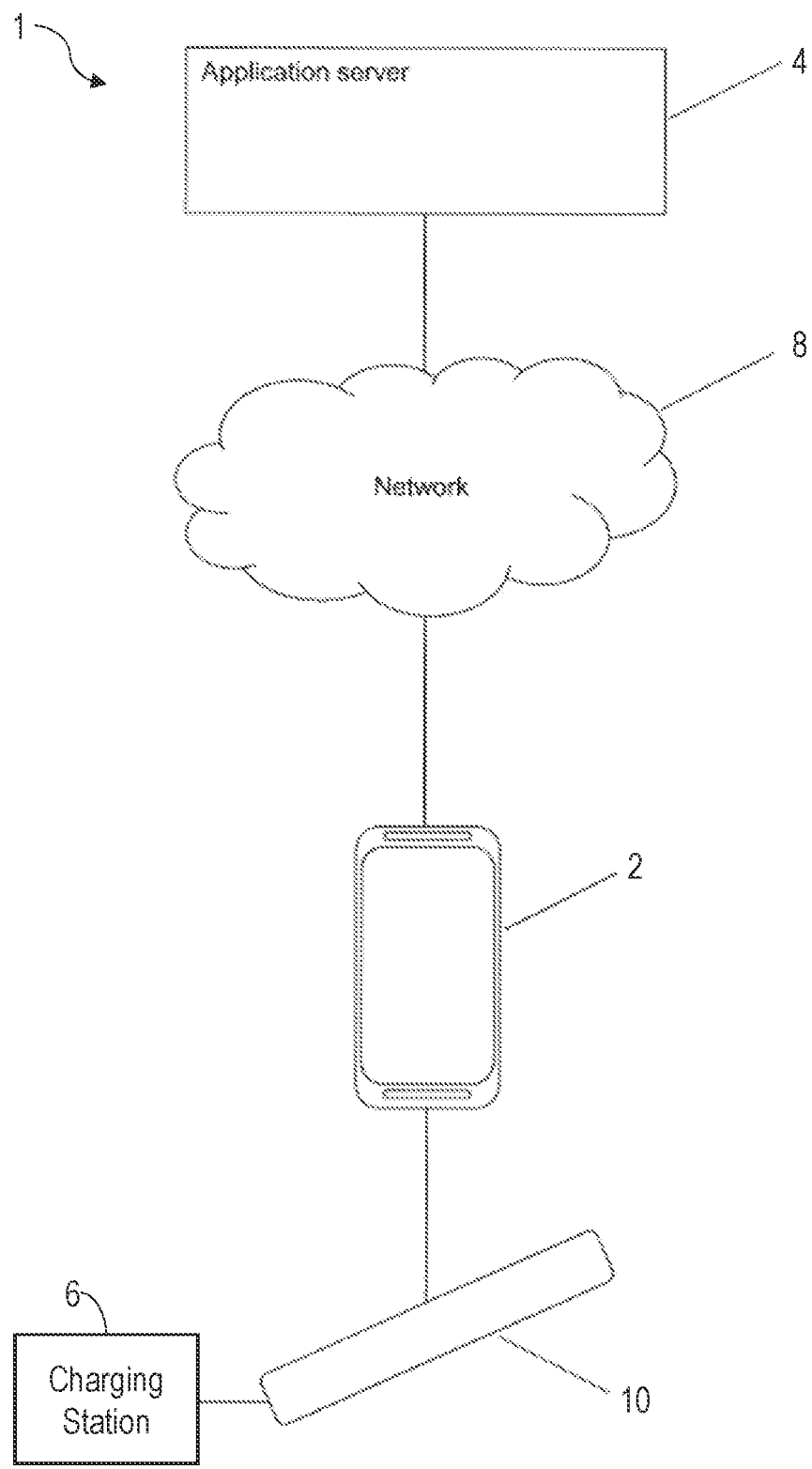
FIG. 1 shows an example system of the first mode for managing a smoking substitute device.

FIG. 1 shows an example system 1 for managing a smoking substitute device 10.

The system 1 as shown in FIG. 1 includes a mobile device 2, an application server 4, an optional charging station 6, as well as the smoking substitute device 10.

The smoking substitute device 10 is configured to communicate wirelessly, e.g., via Bluetooth®, with an application (or "app") installed on the mobile device 2, e.g., via a suitable wireless interface (not shown) on the mobile device 2. The mobile device 2 may be a mobile phone, for example. The application on the mobile phone is configured to communicate with the application server 4, via a network 8. The application server 4 may utilize cloud storage, for example.

The network 8 may include a cellular network and/or the internet.

A skilled person would readily appreciate that the mobile device 2 may be configured to communicate via the network 8 according to various communication channels, preferably a wireless communication channel such as via a cellular network (e.g., according to a standard protocol, such as 3G or 4G) or via a Wi-Fi® network.

The app installed on the mobile device and the application server 4 may be configured to assist a user with their smoking substitute device 10, based on information communicated between the smoking substitute device 10 and the app and/or information communicated between the app and the application server 4.

The charging station 6 (if present) may be configured to charge (and optionally communicate with) the smoking substitute device 10, via a charging port on the smoking substitute device 10. The charging port on the smoking substitute device 10 may be a USB port, for example, which may allow the smoking substitute device to be charged by any USB-compatible device capable of delivering power to the smoking substitute device 10 via a suitable USB cable (in this case the USB-compatible device would be acting as the charging station 6). Alternatively, the charging station could be a docking station specifically configured to dock with the smoking substitute device 10 and charge the smoking substitute device 10 via the charging port on the smoking substitute device 10.

FIG. 2A shows an example smoking substitute device 110 for use as the smoking substitute device 10 in the system 1 of FIG. 1.

In this example, the smoking substitute device 110 includes a main body 120 and a consumable 150. The consumable 150 may alternatively be referred to as a "pod".

In this example, the smoking substitute device 110 is a closed system vaping device, wherein the consumable 150 includes a sealed tank 156 and is intended for one-use only.

FIG. 2A shows the smoking substitute device 110 with the main body 120 physically coupled to the consumable 150. FIG. 2B shows the main body 120 of the smoking substitute device 110 without the consumable 150. FIG. 2C shows the consumable 150 of the smoking substitute device 110 without the main body 120.

The main body 120 and the consumable 150 are configured to be physically coupled together, in this example by pushing the consumable 150 into an aperture in a top end 122 of the main body 120, e.g., with the consumable 150 being retained in the aperture via an interference fit. In other examples, the main body 120 and the consumable could be physically coupled together by screwing one onto the other, through a bayonet fitting, or through a snap engagement mechanism, for example. An optional light 126, e.g., an LED located behind a small translucent cover, is located a bottom end 124 of the main body 120. The light 126 may be configured to illuminate when the smoking substitute device 110 is activated.

The consumable 150 includes a mouthpiece (not shown) at a top end 152 of the consumable 150, as well as one or more air inlets (not shown in FIG. 2) so that air can be drawn into the smoking substitute device 110 when a user inhales through the mouthpiece. At a bottom end 154 of the consumable 150, there is located a tank 156 that contains e-liquid. The tank 156 may be a translucent body, for example.

The tank 156 preferably includes a window 158, so that the amount of e-liquid in the tank 156 can be visually assessed. The main body 120 includes a slot 128 so that the window 158 of the consumable 150can be seen whilst the rest of the tank 156 is obscured from view when the consumable 150 is inserted into the aperture in the top end 122 of the main body 120.

In this present embodiment, the consumable 302 is a "single-use" consumable. That is, upon exhausting the e-liquid in the tank 156, the intention is that the user disposes of the whole consumable 150. In other embodiments, the e-liquid (i.e., aerosol former) may be the only part of the system that is truly "single-use". In such embodiments, the tank 156 may be refillable with e-liquid or the e-liquid may be stored in a non-consumable component of the system. For example, the e-liquid may be stored in a tank located in the device or stored in another component that is itself not single-use (e.g., a refillable tank).

The tank 156 may be referred to as a "clearomizer" if it includes a window 158, or a "cartomizer" if it does not.

Figure 3A:
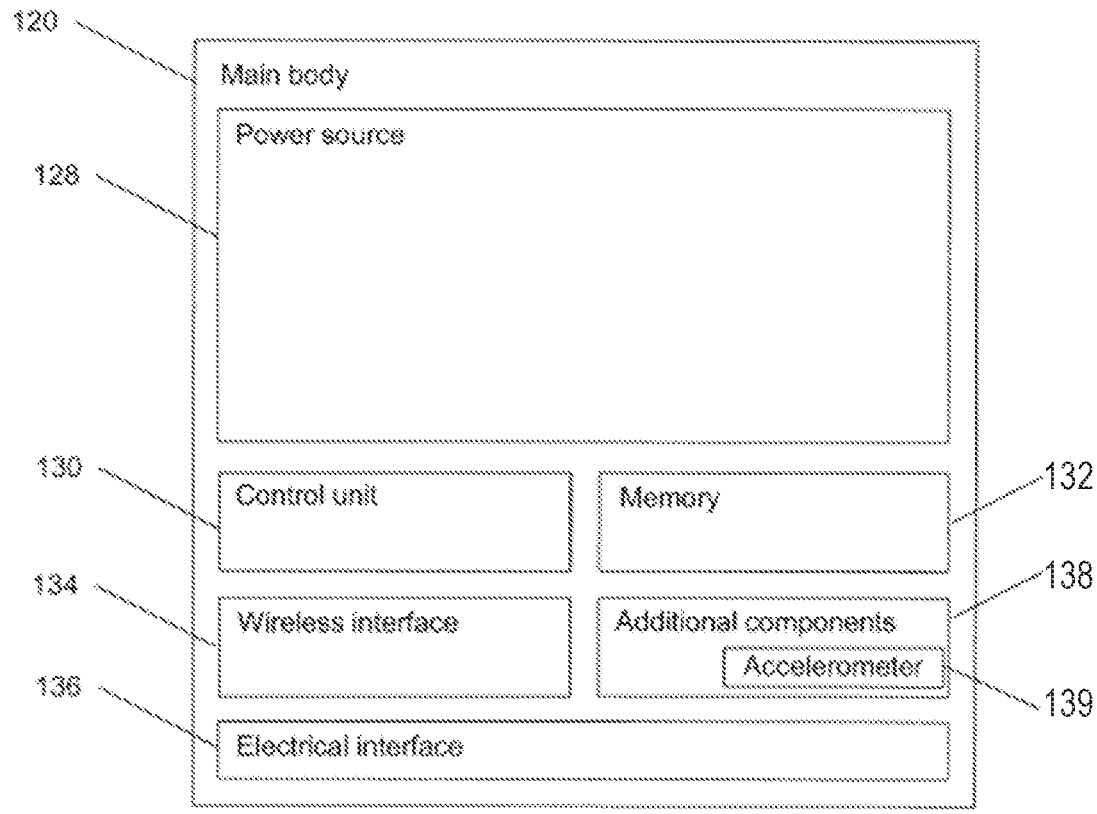
FIG. 3A is a schematic view of the main body of the smoking substitute device of FIG. 2A.

FIG. 3A is a schematic view of the main body 120 of the smoking substitute device 110.

Figure 3B:
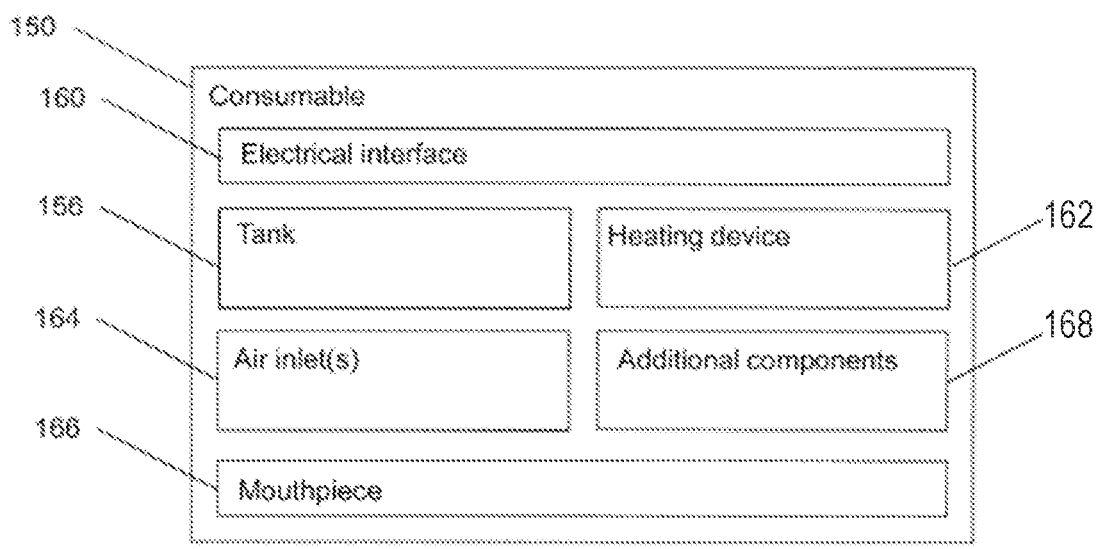
FIG. 3B is a schematic view of the consumable of the smoking substitute device of FIG. 2A.

FIG. 3B is a schematic view of the consumable 150 of the smoking substitute device 110.

As shown in FIG. 3A, the main body 120 includes a power source 128, a control unit 130, a memory 132, a wireless interface 134, an electrical interface 136, and, optionally, one or more additional components 138.

The power source 128 is preferably a battery, more preferably a rechargeable battery.

The control unit 130 may include a microprocessor, for example.

The memory 132 is preferably a non-transitory, computer-readable, non-volatile memory.

The wireless interface 134 is preferably configured to communicate wirelessly with the mobile device 2, e.g., via Bluetooth®. To this end, the wireless interface 134 could include a Bluetooth® antenna. Other wireless communication interfaces, e.g., Wi-Fi®, are also possible.

The electrical interface 136 of the main body 120 may include one or more electrical contacts. The electrical interface 136 may be located in, and preferably at the bottom of, the aperture in the top end 122 of the main body 120. When the main body 120 is physically coupled to the consumable 150, the electrical interface 136 may be configured to pass electrical power from the power source 128 to (e.g., a heating device of) the consumable 150 when the smoking substitute device 110 is activated, e.g., via the electrical interface 160 of the consumable 150 (discussed below). When the main body 120 is not physically coupled to the consumable 150, the electrical interface may be configured to receive power from the charging station 6.

The additional components 138 of the main body 120 may include the optional light 126 discussed above.

The additional components 138 of the main body 120 may, if the power source 128 is a rechargeable battery, include a charging port configured to receive power from the charging station 6. This may be located at the bottom end 124 of the main body 120. Alternatively, the electrical interface 136 discussed above is configured to act as a charging port configured to receive power from the charging station 6 such that a separate charging port is not required.

The additional components 138 of the main body 120 may, if the power source 128 is a rechargeable battery, include a battery charging control circuit, for controlling the charging of the rechargeable battery. However, a battery charging control circuit could equally be located in the charging station 6 (if present).

The additional components 138 of the main body 120 may include an airflow sensor for detecting airflow in the smoking substitute device 110, e.g., caused by a user inhaling through a mouthpiece 166 (discussed below) of the smoking substitute device 110. The smoking substitute device 110 may be configured to be activated when airflow is detected by the airflow sensor. This optional sensor could alternatively be included in the consumable 150 (though this is less preferred where the consumable 150 is intended to be disposed of after use, as in this example).

The additional components 138 of the main body 120 may include an actuator, e.g., a button. The smoking substitute device 110 may be configured to be activated when the actuator is actuated. This provides an alternative to the airflow sensor noted, as a mechanism for activating the smoking substitute device 110.

The additional components 138 of the main body 120 includes an accelerometer 139, which is configured to detect an orientation of the smoking substitute device and provide data indicative of the detected orientation to the control unit 130. The accelerometer 139 may be, for example, a piezo-electric-based accelerometer, or a capacitance-based accelerometer, integrated within a chip within the main body.

The additional components 138 of the main body 120 may include a reader configured to read information associated with the consumable from a machine-readable data source included in (e.g., contained in the body of, or attached to) the consumable 150.

The reader may be configured to read information from the machine-readable data source wirelessly, e.g., via electromagnetic waves or optically. Thus, for example, the machine-readable data source included in the consumable 150 could be an RFID tag (in which case the reader included in the main body 120 may be an RFID reader) or a visual data source such as a barcode (in which case the reader included in the main body may be an optical reader, e.g., a barcode scanner). Various wireless technologies and protocols may be employed to allow the reader to wirelessly read information from a machine-readable data source included in or attached to the consumable 150, e.g., NFC, Bluetooth®, Wi-Fi®, as would be appreciated by a skilled person.

For avoidance of any doubt, the reader (if present) may be configured to read information from the machine-readable data source non-wirelessly, e.g., using a direct electrical connection between the main body 120 and consumable 150.

As shown in FIG. 3B, the consumable 150 includes the tank 156, an electrical interface 160, a heating device 162, one or more air inlets 164, a mouthpiece 166, and, optionally, one or more additional components 168.

The electrical interface 160 of the consumable 150 may include one or more electrical contacts. The electrical interface 136 of the main body 120 and an electrical interface 160 of the consumable 150 are preferably configured to contact each other and therefore electrically couple the main body 120 to the consumable 150 when the main body 120 is physically coupled to the consumable 150. In this way, electrical energy (e.g., in the form of an electrical current) is able to be supplied from the power source 128 in the main body 120 to the heating device 162 in the consumable 150.

The heating device 162 is preferably configured to heat e-liquid contained in the tank 156, e.g., using electrical energy supplied from the power source 128. In one example, the heating device 162 may include a heating filament and a wick, wherein a first portion of the wick extends into the tank 156 in order to draw e-liquid out from the tank 156, and wherein the heating filament coils around a second portion of the wick located outside the tank 156. In this example, the heating filament is configured to heat up e-liquid drawn out of the tank 156 by the wick to produce an aerosol vapor. In this example, the wick is located generally below the tank 156 and is fed vaporizable liquid via gravity and capillary action.

The one or more air inlets 164 are preferably configured to allow air to be drawn into the smoking substitute device 110, when a user inhales through the mouthpiece 166.

The additional components 168 of the consumable 150 may include a machine-readable data source, which may, e.g., be contained in the body of, or attached to the consumable 150. The machine-readable data source may store information associated with the consumable. The information associated with the consumable may include information concerning the content of the consumable (e.g., e-liquid type, batch number) and/or a unique identifier, for example.

The machine-readable data source may be rewritable, e.g., a rewritable RFID chip, or read only, e.g., a visual data source such as a barcode. As indicated above, the additional components 138 of the main body 120 may include a reader configured to read information associated with the consumable from the machine-readable data source.

In use, a user activates the smoking substitute device 110, e.g., through actuating an actuator included in the main body 120 or by inhaling through the mouthpiece 166 as described above. Upon activation, the control unit 130 may supply electrical energy from the power source 128 to the heating device 162 (via electrical interfaces 136, 166), which may cause the heating device 162 to heat e-liquid drawn from the tank 156 to produce a vapor which is inhaled by a user through the mouthpiece 166.

Of course, a skilled reader would readily appreciate that the smoking substitute device 110 shown in FIG. 2 and FIG. 3 shows just one example implementation of a smoking substitute device, and that other forms of smoking substitute device could be used as the smoking substitute device 10 of FIG. 1.

By way of example, a HNB smoking substitute device including a main body and a consumable could be used as the smoking substitute device 10 of FIG. 1, instead of the smoking substitute device 110. One such HNB smoking substitute device is the IQOS® smoking substitute device discussed above.

As another example, an open system vaping device which includes a main body, a refillable tank, and a mouthpiece could be used as the smoking substitute device 10 of FIG. 1, instead of the smoking substitute device 110. One such open system vaping device is the blu PRO® e-cigarette discussed above.

As another example, an entirely disposable (one use) smoking substitute device could be used as the smoking substitute device 10 of FIG. 1, instead of the smoking substitute device 110.

Figure 4:
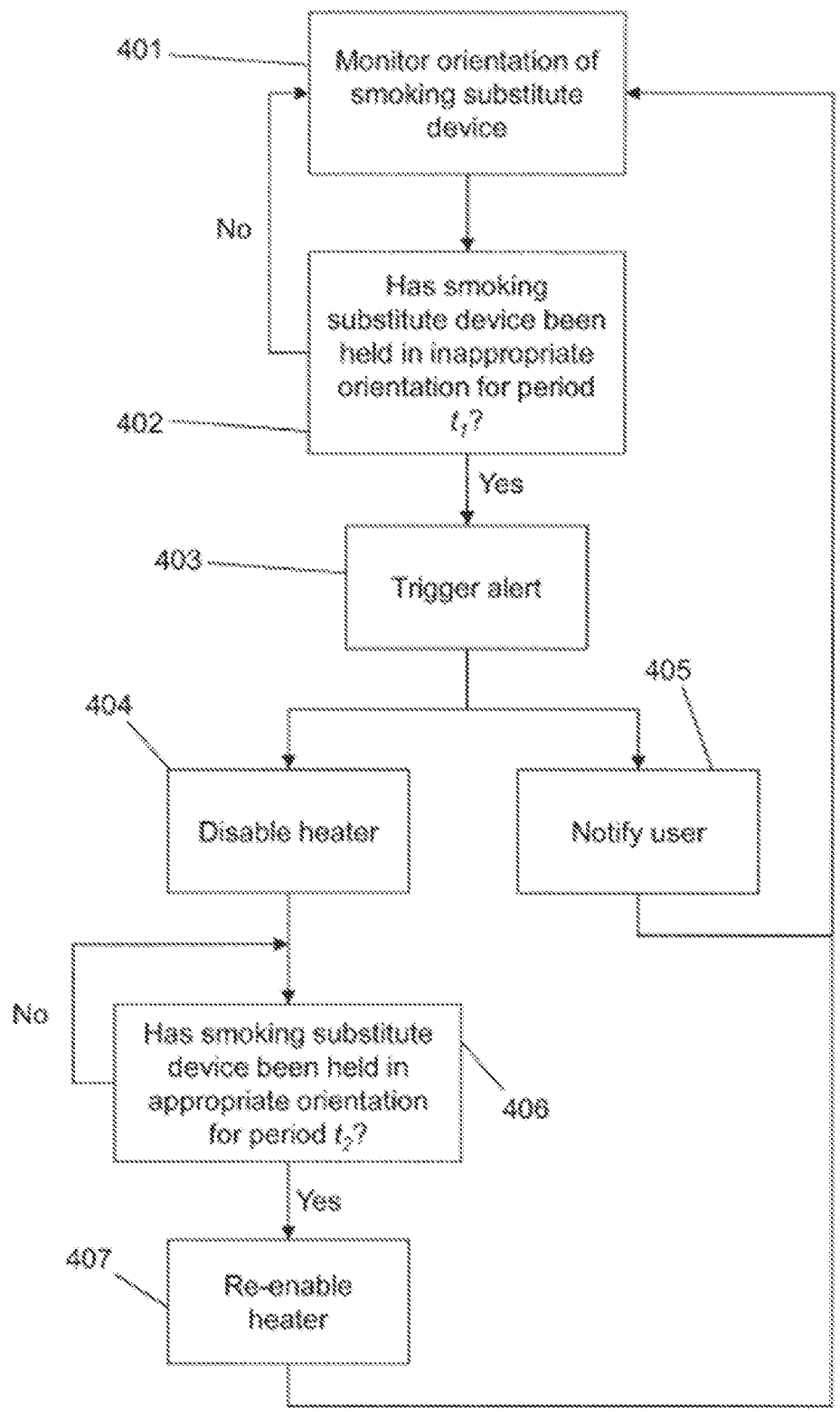
FIG. 4 is a flow diagram showing a method of the first mode of using the smoking substitute device.

FIG. 4 shows a method of operating the smoking substitute device 110 described previously. In a first step, 401, the control unit 130 monitors the orientation of the smoking substitute device via data indicative of a detected orientation of the smoking substitute device as provided by the accelerometer 139.

Subsequently, in step 402, the control unit 130 determines whether the smoking substitute device has been held in an inappropriate orientation for a time period $t_1$. In this example, an inappropriate orientation is one in which the wick of the heating device 162 does not receive a sufficient supply of vaporizable liquid, e.g., because it is above the tank 156 containing the liquid. The time period $t_1$, corresponding to the second predetermined time period discussed above, may be at least 30 minutes, at least 60 minutes, at least 120 minutes, at least 180 minutes, or more than 180 minutes. Additionally, or alternatively, the control unit 130 may determine whether the smoking substitute device was held in an inappropriate orientation whilst the heating device 162 was used. Such conditions can desaturate the wick faster than if the smoking substitute device was held in an appropriate orientation during such use.

If the determination is that this is not the case, 'No', the method enters a loop and returns to step 401. If the determination is that this is the case, 'Yes', the method moves to step 403 wherein an alert is triggered.

Triggering the alert, in step 403, can then involve either or both of steps 404 and 405.

In step 404, the heating device 162 is disabled, thereby disabling the smoking substitute device 10.

In step 405, the user is notified that the smoking substitute device will function improperly. Notifying the user can be performed in plural ways. For example, an indicator light in the main body 120 may illuminate or show that the smoking substitute device will function improperly. Additionally, or alternatively, the control unit 130 may transmit a message to a remote device (e.g., mobile device 2) indicating that the smoking substitute device will function improperly, and this remote device may then notify the user.

Subsequently, in step 406, a determination is made as to whether the smoking substitute device has been held in an appropriate orientation for a time period $t_2$, corresponding to the first predetermined time period discussed above. As discussed previously, time period $t_2$ may be at least 1 second, at least 2 seconds, at least 3 seconds, at least 4 seconds. If it is determined that this is not the case, 'No', the method enters a loop and runs the determination again. If it is determined that it is the case, 'Yes', the method moves to step 407 and the heater is re-enabled.

Steps 402-407 discussed above may be performed entirely by the control unit 130 of the main body 120 of the smoking substitute device. Alternatively, some, or indeed all, of the steps may be performed by a remote device 2, 4, to which the smoking substitute device is connected.

The features disclosed in the foregoing description, or in the following claims, or in the accompanying drawings, expressed in their specific forms or in terms of a means for performing the disclosed function, or a method or process for obtaining the disclosed results, as appropriate, may, separately, or in any combination of such features, be utilized for realizing the present disclosure in diverse forms thereof.

While the present disclosure has been described in conjunction with the exemplary embodiments described above, many equivalent modifications and variations will be apparent to those skilled in the art when given this disclosure. Accordingly, the exemplary embodiments of the present disclosure set forth above are considered to be illustrative and not limiting. Various changes to the described embodiments may be made without departing from the spirit and scope of the present disclosure.

Second Mode: A Smoking Substitute Device Comprising a Printed Circuit Board Assembly Aspects and embodiments of the second mode of present disclosure will now be discussed with reference to the accompanying figures. Further aspects and embodiments of the second mode will be apparent to those skilled in the art. All documents mentioned in this text are incorporated herein by reference.

Figure 5:
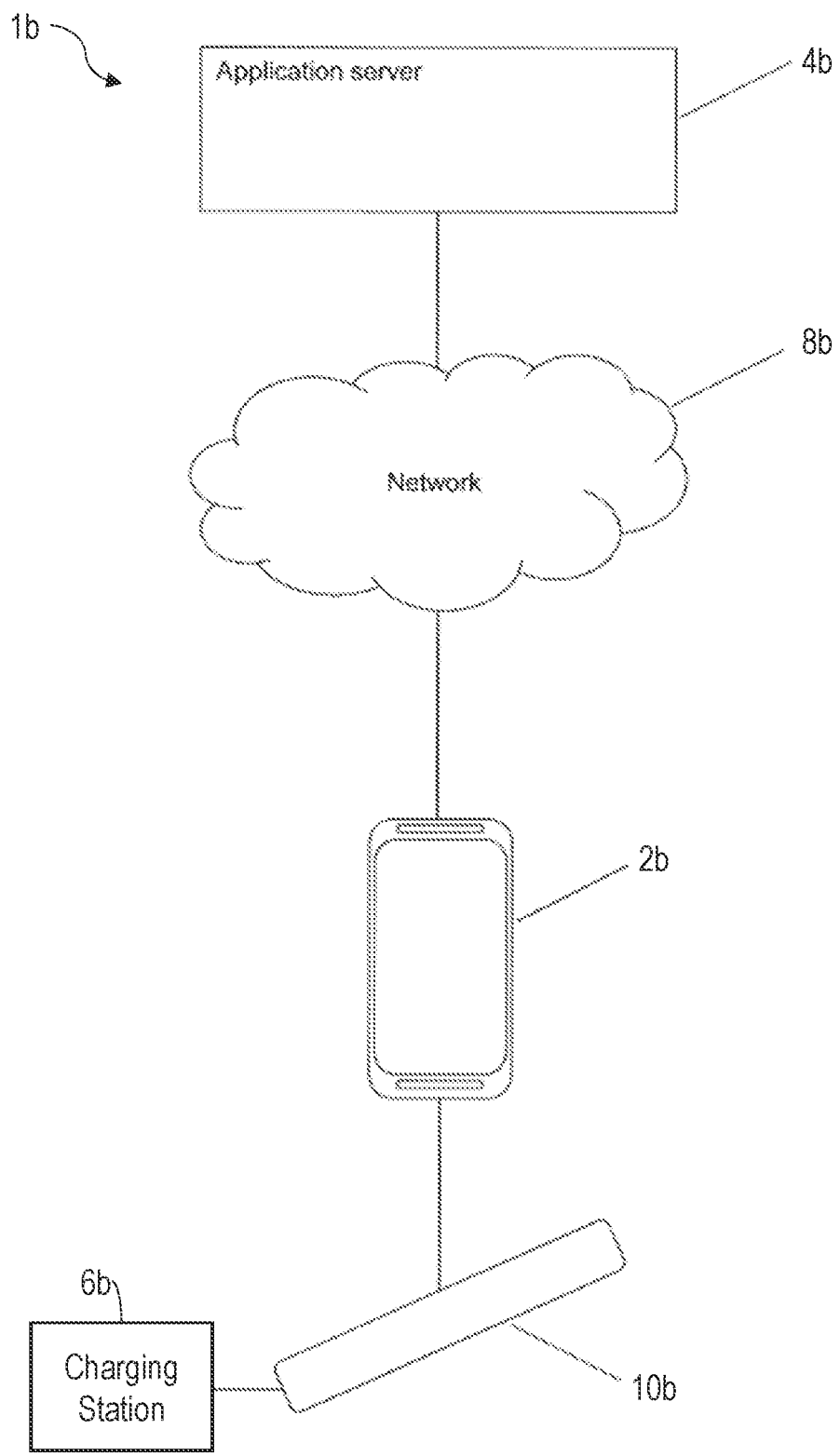
FIG. 5 shows an example system of the second mode for managing a smoking substitute device.

FIG. 5 shows an example system 1b for managing a smoking substitute device 10b.

The system 1b as shown in FIG. 5 includes a mobile device 2b, an application server 4b, an optional charging station 6b, as well as the smoking substitute device 10b.

The smoking substitute device 10b is configured to communicate wirelessly, e.g., via Bluetooth®, with an application (or "app") installed on the mobile device 2b, e.g., via a suitable wireless interface (not shown) on the mobile device 2b. The mobile device 2b may be a mobile phone, for example. The application on the mobile phone is configured to communicate with the application server 4b, via a network 8b. The application server 4b may utilize cloud storage, for example.

The network 8b may include a cellular network and/or the internet.

A skilled person would readily appreciate that the mobile device 2b may be configured to communicate via the network 8b according to various communication channels, preferably a wireless communication channel such as via a cellular network (e.g., according to a standard protocol, such as 3G or 4G) or via a Wi-Fi® network.

The app installed on the mobile device and the application server 4b may be configured to assist a user with their smoking substitute device 10b, based on information communicated between the smoking substitute device 10b and the app and/or information communicated between the app and the application server 4b.

The charging station 6b (if present) may be configured to charge (and optionally communicate with) the smoking substitute device 10b, via a charging port on the smoking substitute device 10b. The charging port on the smoking substitute device 10b may be a USB port, for example, which may allow the smoking substitute device to be charged by any USB-compatible device capable of delivering power to the smoking substitute device 10b via a suitable USB cable (in this case the USB-compatible device would be acting as the charging station 6b). Alternatively, the charging station could be a docking station specifically configured to dock with the smoking substitute device 10b and charge the smoking substitute device 10b via the charging port on the smoking substitute device 10b.

FIG. 6A shows an example smoking substitute device 110b for use as the smoking substitute device 10b in the system 1 of FIG. 5.

In this example, the smoking substitute device 110b includes a main body 120b and a consumable 150b. The consumable 150b may alternatively be referred to as a "pod".

In this example, the smoking substitute device 110b is a closed system vaping device, wherein the consumable 150b includes a sealed tank 156b and is intended for one-use only.

FIG. 6A shows the smoking substitute device 110b with the main body 120b physically coupled to the consumable 150b.

FIG. 6B shows the main body 120b of the smoking substitute device 110b without the consumable 150b.

FIG. 6C shows the consumable 150b of the smoking substitute device 110b without the main body 120b.

The main body 120b and the consumable 150b are configured to be physically coupled together, in this example by pushing the consumable 150b into an aperture in a top end 122b of the main body 120b, e.g., with the consumable 150b being retained in the aperture via an interference fit. In other examples, the main body 120b and the consumable could be physically coupled together by screwing one onto the other, through a bayonet fitting, or through a snap engagement mechanism, for example. An optional light 126b, e.g., an LED located behind a small translucent cover, is located a bottom end 124b of the main body 120b. The light 126b may be configured to illuminate when the smoking substitute device 110b is activated.

The consumable 150b includes a mouthpiece (not shown) at a top end 152b of the consumable 150b, as well as one or more air inlets (not shown in FIG. 6) so that air can be drawn into the smoking substitute device 110b when a user inhales through the mouthpiece. At a bottom end 154b of the consumable 150b, there is located a tank 156b that contains e-liquid. The tank 156b may be a translucent body, for example.

The tank 156b preferably includes a window 158b, so that the amount of e-liquid in the tank 156b can be visually assessed. The main body 120b includes a slot 128b so that the window 158b of the consumable 150b can be seen whilst the rest of the tank 156b is obscured from view when the consumable 150b is inserted into the aperture in the top end 122b of the main body 120b.

In this present embodiment, the consumable 150b is a "single-use" consumable. That is, upon exhausting the e-liquid in the tank 156b, the intention is that the user disposes of the whole consumable 150b. In other embodiments, the e-liquid (i.e., aerosol former) may be the only part of the system that is truly "single-use". In such embodiments, the tank 156b may be refillable with e-liquid or the e-liquid may be stored in a non-consumable component of the system. For example, the e-liquid may be stored in a tank located in the device or stored in another component that is itself not single-use (e.g., a refillable tank).

The tank 156b may be referred to as a "clearomizer" if it includes a window 158b, or a "cartomizer" if it does not.

Figure 7A:
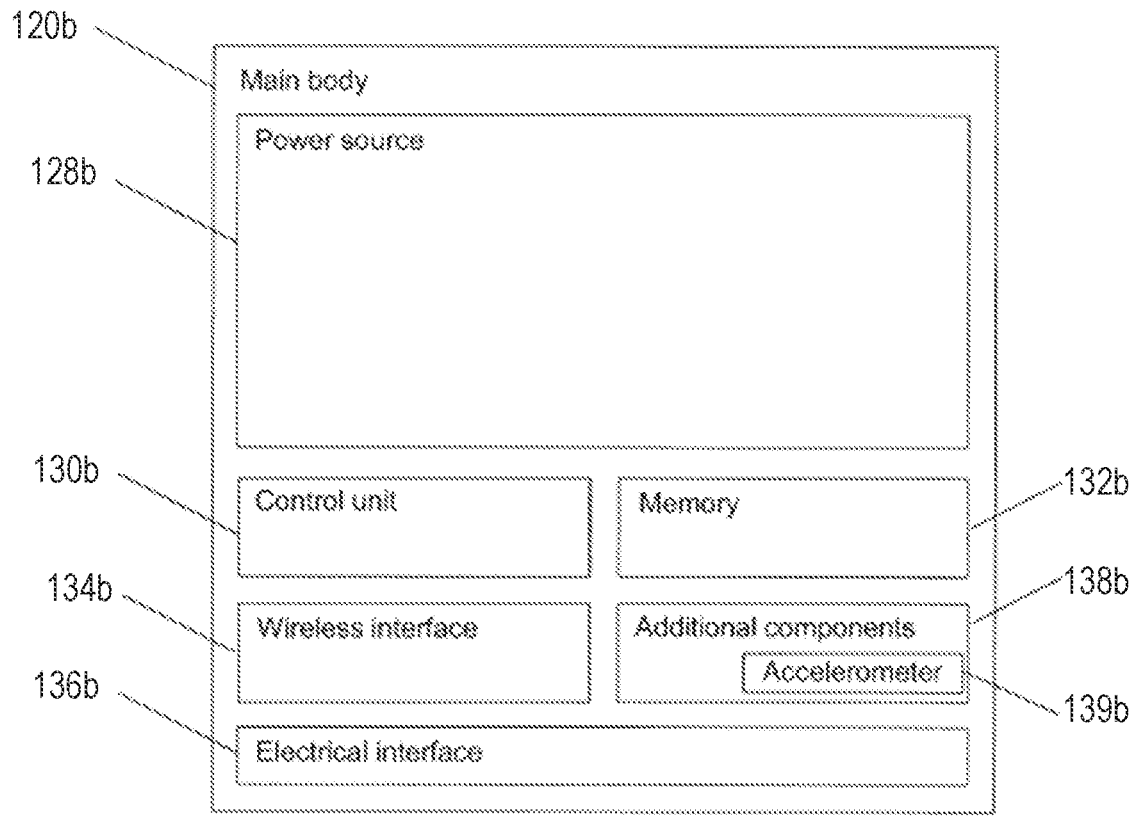
FIG. 7A is a schematic view of the main body of the smoking substitute device of FIG. 6A.
Figure 7B:
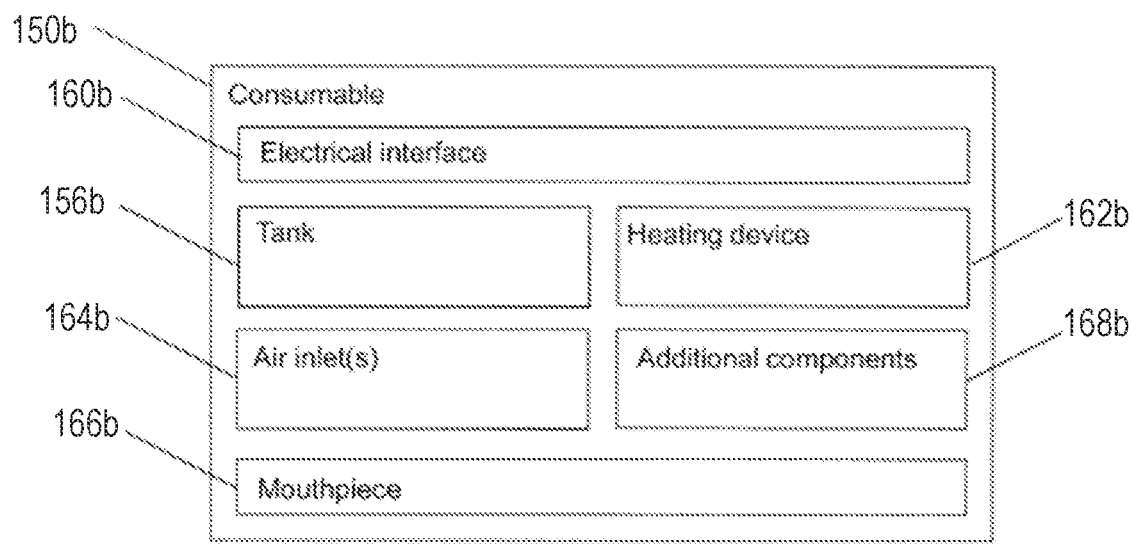
FIG. 7B is a schematic view of the consumable of the smoking substitute device of FIG. 6A.

FIG. 7A is a schematic view of the main body 120b of the smoking substitute device 110b. FIG. 7B is a schematic view of the consumable 150b of the smoking substitute device 110b. As shown in FIG. 7A, the main body 120b includes a power source 128b, a control unit 130b, a memory 132b, a wireless interface 134b, an electrical interface 136b, and, optionally, one or more additional components 138b.

The power source 128b is preferably a battery, more preferably a rechargeable battery.

The control unit 130b may include a microprocessor, for example.

The memory 132b is preferably a non-volatile, non-transitory, computer-readable memory.

The wireless interface 134b is preferably configured to communicate wirelessly with the mobile device 2b, e.g., via Bluetooth®. To this end, the wireless interface 134b could include a Bluetooth® antenna. Other wireless communication interfaces, e.g., Wi-Fi®, are also possible.

The electrical interface 136b of the main body 120b may include one or more electrical contacts. The electrical interface 136b may be located in, and preferably at the bottom of, the aperture in the top end 122b of the main body 120b. When the main body 120b is physically coupled to the consumable 150b, the electrical interface 136b may be configured to pass electrical power from the power source 128b to (e.g., a heating device of) the consumable 150b when the smoking substitute device 110b is activated, e.g., via the electrical interface 160b of the consumable 150b (discussed below). When the main body 120b is not physically coupled to the consumable 150b, the electrical interface may be configured to receive power from the charging station 6b.

The additional components 138b of the main body 120b may include the optional light 126b discussed above.

The additional components 138b of the main body 120b may, if the power source 128b is a rechargeable battery, include a charging port configured to receive power from the charging station 6b. This may be located at the bottom end 124b of the main body 120b. Alternatively, the electrical interface 136b discussed above is configured to act as a charging port configured to receive power from the charging station 6b such that a separate charging port is not required.

The additional components 138b of the main body 120b may, if the power source 128b is a rechargeable battery, include a battery charging control circuit, for controlling the charging of the rechargeable battery. However, a battery charging control circuit could equally be located in the charging station 6b (if present).

The additional components 138b of the main body 120b may include an airflow sensor for detecting airflow in the smoking substitute device 110b, e.g., caused by a user inhaling through a mouthpiece 166b (discussed below) of the smoking substitute device 110b. The smoking substitute device 110b may be configured to be activated when airflow is detected by the airflow sensor. This optional sensor could alternatively be included in the consumable 150b (though this is less preferred where the consumable 150b is intended to be disposed of after use, as in this example).

The additional components 138b of the main body 120b may include an actuator, e.g., a button. The smoking substitute device 110b may be configured to be activated when the actuator is actuated. This provides an alternative to the airflow sensor noted, as a mechanism for activating the smoking substitute device 110b.

The additional components 138b of the main body 120b includes a connector port 139b, which is configured to allow the battery to be recharged and which may allow data to be transmitted from the control unit 130b.

The additional components 138b of the main body 120b may include a reader configured to read information associated with the consumable from a machine-readable data source included in (e.g., contained in the body of, or attached to) the consumable 150b.

The reader may be configured to read information from the machine-readable data source wirelessly, e.g., via electromagnetic waves or optically. Thus, for example, the machine-readable data source included in the consumable 150b could be an RFID tag (in which case the reader included in the main body 120b may be an RFID reader) or a visual data source such as a barcode (in which case the reader included in the main body may be an optical reader, e.g., a barcode scanner). Various wireless technologies and protocols may be employed to allow the reader to wirelessly read information from a machine-readable data source included in or attached to the consumable 150b, e.g., NFC, Bluetooth®, Wi-Fi®, as would be appreciated by a skilled person.

For avoidance of any doubt, the reader (if present) may be configured to read information from the machine-readable data source non-wirelessly, e.g., using a direct electrical connection between the main body 120b and consumable 150b.

As shown in FIG. 7B, the consumable 150b includes the tank 156b, an electrical interface 160b, a heating device 162b, one or more air inlets 164b, a mouthpiece 166b, and, optionally, one or more additional components 168b.

The electrical interface 160b of the consumable 150b may include one or more electrical contacts. The electrical interface 136b of the main body 120b and an electrical interface 160b of the consumable 150b are preferably configured to contact each other and therefore electrically couple the main body 120b to the consumable 150b when the main body 120b is physically coupled to the consumable 150b. In this way, electrical energy (e.g., in the form of an electrical current) is able to be supplied from the power source 128b in the main body 120b to the heating device 162b in the consumable 150b.

The heating device 162b is preferably configured to heat e-liquid contained in the tank 156b, e.g., using electrical energy supplied from the power source 128b. In one example, the heating device 162b may include a heating filament and a wick, wherein a first portion of the wick extends into the tank 156b in order to draw e-liquid out from the tank 156b, and wherein the heating filament coils around a second portion of the wick located outside the tank 156b. In this example, the heating filament is configured to heat up e-liquid drawn out of the tank 156b by the wick to produce an aerosol vapor. In this example, the wick is located generally below the tank 156b and is fed vaporizable liquid via gravity and capillary action.

The one or more air inlets 164b are preferably configured to allow air to be drawn into the smoking substitute device 110b when a user inhales through the mouthpiece 166b.

The additional components 168b of the consumable 150b may include a machine-readable data source, which may e.g., be contained in the body of, or attached to the consumable 150b. The machine-readable data source may store information associated with the consumable. The information associated with the consumable may include information concerning the content of the consumable (e.g., e-liquid type, batch number) and/or a unique identifier, for example.

The machine-readable data source may be rewritable, e.g., a rewritable RFID chip, or read only, e.g., a visual data source such as a barcode. As indicated above, the additional components 138b of the main body 120b may include a reader configured to read information associated with the consumable from the machine-readable data source.

In use, a user activates the smoking substitute device 110b, e.g., through actuating an actuator included in the main body 120b or by inhaling through the mouthpiece 166b as described above. Upon activation, the control unit 130b may supply electrical energy from the power source 128b to the heating device 162b (via electrical interfaces 136b, 166b), which may cause the heating device 162b to heat e-liquid drawn from the tank 156b to produce a vapor which is inhaled by a user through the mouthpiece 166b.

Of course, a skilled reader would readily appreciate that the smoking substitute device 110b shown in FIG. 6 and FIG. 7 shows just one example implementation of a smoking substitute device, and that other forms of smoking substitute device could be used as the smoking substitute device 10b of FIG. 5.

By way of example, a HNB smoking substitute device including a main body and a consumable could be used as the smoking substitute device 10b of FIG. 5, instead of the smoking substitute device 110b. One such HNB smoking substitute device is the IQOS® smoking substitute device discussed above.

As another example, an open system vaping device which includes a main body, a refillable tank, and a mouthpiece could be used as the smoking substitute device 10b of FIG. 5, instead of the smoking substitute device 110b. One such open system vaping device is the blu PRO® e-cigarette discussed above.

As another example, an entirely disposable (one use) smoking substitute device could be used as the smoking substitute device 10b of FIG. 5, instead of the smoking substitute device 110b.

Figure 8:
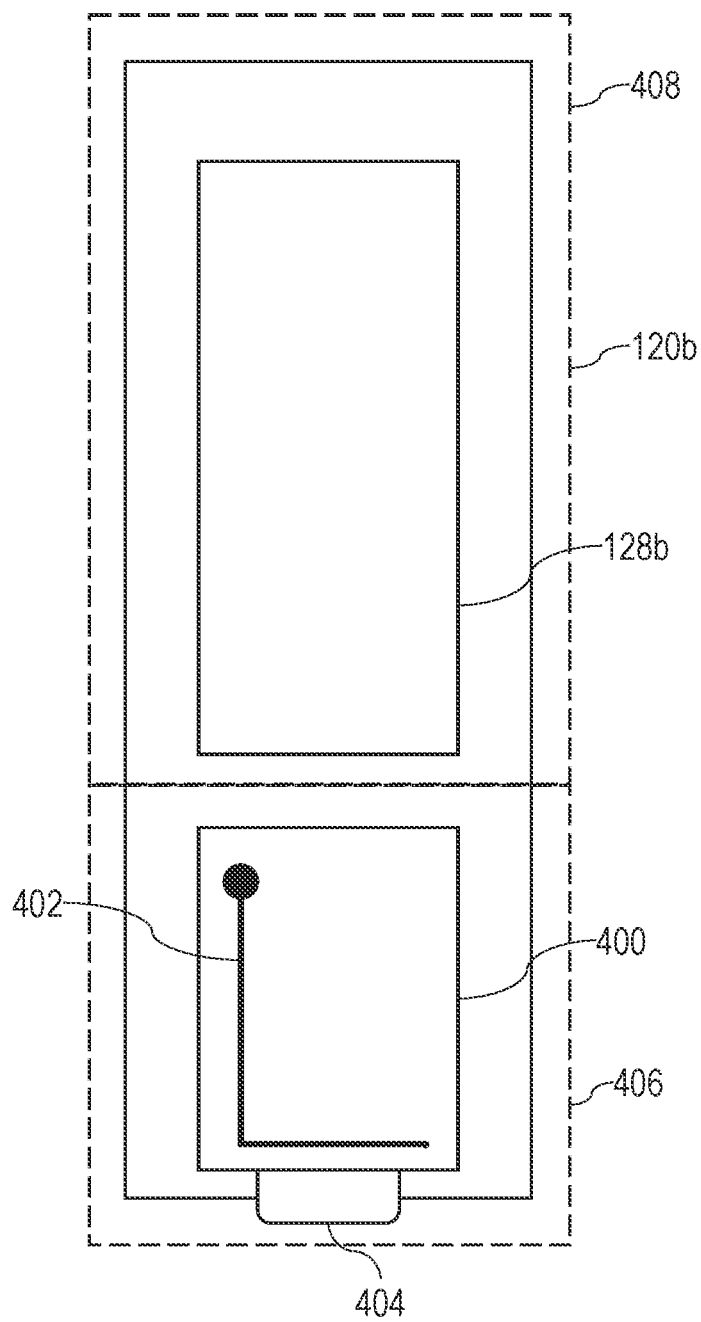
FIG. 8 is a partial cross-sectional view of the main body of FIG. 6B.

FIG. 8 shows a partial cross section of the main body 120b shown in FIG. 7B. Within the main body 120b, is a battery 128b, printed circuit board assembly 400, wire antenna 402, and USB connector 404. The wire antenna 402 is soldered to a plated hole of the printed circuit board assembly 400, and is in communication with a control unit 130b installed within the printed circuit assembly 400. The wire antenna 402b allows the control unit 130b to wirelessly communicate with a remote device.

The wire antenna 402 is connected to a portion of the printed circuit board assembly 400 which is in one corner of the board. The wire antenna 402 then extends parallel to one side of the printed circuit board, in a direction away from the battery 128b. The wire antenna 402 then undergoes an approximately 90° turn, in a corner of the printed circuit board 400, before extending along a further side of the printed circuit board 400 in a direction perpendicular to the first direction. The wire antenna 402 is formed of copper, and in some examples has an insulating coating disposed around the copper.

The housing of the main body 120b, shown in FIG. 8, comprises two segments indicated by the dashed lines. A first segment 406 contains a portion of the printed circuit board assembly 400, wire antenna 402, and USB connector 404. A second segment 408 contains the battery 128b, and the remainder of the printed circuit board 400. In another example, the first segment 406 contains the entire printed circuit board 400. The first segment 406 is made of a material which is transparent to the electromagnetic waves transmitted and received by the wire antenna 402. For example, the first segment 406 may be formed from a plastic. The second segment 408 is made of a material which is opaque to the electromagnetic waves transmitted and received by the wire antenna 402. For example, the second segment 408 may be formed from metal. By forming the second segment 408 from metal, the battery 128b can be better protected from shocks or piercing.

However, by also forming the first segment 406 from the transparent material, the wire antenna 402 can still communicate with a remote device.

Note that the wire antenna 402 is located between an extremity of the smoking substitute device closer to the printed circuit board assembly 400 than the battery 128b (the bottom extremity of the main body 120b as shown in FIG. 8), and an extremity of the battery 128b closest to the printed circuit board assembly 400 (the bottom extremity of the battery 128b as shown in FIG. 8).

Note also that the wire antenna 402 is located between an extremity of the smoking substitute device (the bottom extremity of the main body 120b as shown in FIG. 8) and an extremity of the battery 128b closest to the printed circuit board assembly 400 (the bottom extremity of the battery 128 as shown in FIG. 8), and the wire antenna 402 is closer to the printed circuit board assembly 400 than the battery 128b.

The resulting smoking substitute device can implement wireless connectivity with a reduction in the footprint required for the wire antenna 402.

For the avoidance of any doubt, any theoretical explanations provided herein are provided for the purposes of improving the understanding of a reader. The inventors are not bound by any of these theoretical explanations.

Any section headings used herein are for organizational purposes only and are not to be construed as limiting the subject matter described.

Throughout this specification, including the claims which follow, unless the context requires otherwise, the word "comprise" and "include", and variations such as "comprises", "comprising", and "including" will be understood to imply the inclusion of a stated integer or step or group of integers or steps but not the exclusion of any other integer or step or group of integers or steps.

It must be noted that, as used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by the use of the antecedent "about," it will be understood that the particular value forms another embodiment. The term "about" in relation to a numerical value is optional and means for example +/−10%.

What is claimed is:

1. A smoking substitute device, comprising:
   a control unit; and
   an accelerometer, configured to detect an orientation of the smoking substitute device and provide data indicative of the detected orientation to the control unit;
   wherein the control unit is configured to trigger an alert when it determines from the data indicative of the detected orientation that the smoking substitute device will function improperly; and
   wherein the control unit is configured to determine from the data indicative of the detected orientation that the smoking substitute device will function improperly when the data indicative of the detected orientation indicates that a gravity fed heating device of the smoking substitute device has been located above a tank containing a vaporizable liquid for a predetermined period of time, wherein the predetermined period of time is at least 30 minutes.

2. The smoking substitute device of claim 1, wherein the control unit is configured to determine whether the smoking substitute device is held in an inappropriate orientation whilst the heating device is being used, and to trigger the alert immediately when it is determined that the smoking substitute device is held in an inappropriate orientation whilst the heating device is being used.

3. The smoking substitute device of claim 1, wherein triggering the alert includes disabling the smoking substitute device.

4. The smoking substitute device of claim 3, wherein the predetermined period of time is a first predetermined period of time, wherein the control unit is configured to re-enable the smoking substitute device when it is determined, via the data indicative of the detected orientation, that the smoking substitute device has been held in an appropriate orientation for a second predetermined period of time.

5. The smoking substitute device of claim 4, wherein the second predetermined period of time is at least 1 second.

6. The smoking substitute device of claim 1, wherein the control unit is configured to re-enable the smoking substitute device when it receives a re-enablement signal from a remote device via a wireless interface of the smoking substitute device.

7. The smoking substitute device of claim 4, wherein the appropriate orientation is one in which a gravity fed heating device of the smoking substitute device is located below a tank containing a vaporizable liquid.

8. The smoking substitute device of claim 1, wherein triggering the alert includes sending a message via a wireless interface to a remote device indicating that the smoking substitute device will function improperly.

9. The smoking substitute device of claim 1, wherein triggering the alert further includes activating an indicator light on the smoking substitute device.

10. The smoking substitute device of claim 1, wherein the control unit is configured to determine from the data indicative of the detected orientation that the smoking substitute device will function improperly when the data indicative of the detected orientation indicates that a wick of the smoking substitute device is not saturated with a vaporizable liquid.

11. A system comprising a smoking substitute device and remote device, wherein the smoking substitute device comprises:
   a control unit;
   an accelerometer configured to detect an orientation of the smoking substitute device and provide data indicative of the detected orientation to the control unit; and
   a wireless interface; and
   wherein the control unit is configured to provide the data indicative of the detected orientation to the remote device via the wireless interface;
   wherein the remote device or control unit is configured to trigger an alert when the remote device or control unit determines from the data indicative of the detected orientation that the smoking substitute device will function improperly; and
   wherein the remote device or control unit is configured to determine from the data indicative of the detected orientation that the smoking substitute device will function improperly when the data indicative of the detected orientation indicates that a gravity fed heating device of the smoking substitute device has been located above a tank containing a vapourisable liquid for a predetermined period of time, wherein the predetermined period of time is at least 30 minutes.

12. The system of claim 11, wherein triggering the alert includes disabling the smoking substitute device.

13. The system of claim 12, wherein the control unit is configured to re-enable the smoking substitute device when it is determined, via data received from the accelerometer, that the smoking substitute device has been held in an appropriate orientation for a first predetermined period of time.

14. The system of claim 13, wherein the appropriate orientation is one in which a gravity fed heating device of the smoking substitute device is located below a tank containing a vaporizable liquid.

15. A method of operating a smoking substitute device, having the steps of:
- monitoring, via an accelerometer of the smoking substitute device, a detected orientation of the smoking substitute device;
- determining, via the detected orientation, that the smoking substitute device will function improperly;
- triggering an alert in response to the determination; and
- determining from data indicative of the detected orientation that the smoking substitute device will function improperly when the data indicative of the detected orientation indicates that a gravity fed heating device of the smoking substitute device has been located above a tank containing a vaporizable liquid for a predetermined period of time, wherein the predetermined period of time is at least 30 minutes.

16. The smoking substitute device of claim 1, wherein the predetermined period of time is within a range from 30 minutes to 180 minutes.

17. The system of claim 11, wherein the predetermined period of time is within a range from 30 minutes to 180 minutes.

18. The method of claim 15, wherein determining from the data is defined further as the predetermined period of time is within a range from 30 minutes to 180 minutes.

\* \* \* \* \*